Aug. 31, 1948.        E. J. GEORGE        2,448,215
ELECTRICAL COOKING DEVICE
Filed March 13, 1945        3 Sheets-Sheet 1
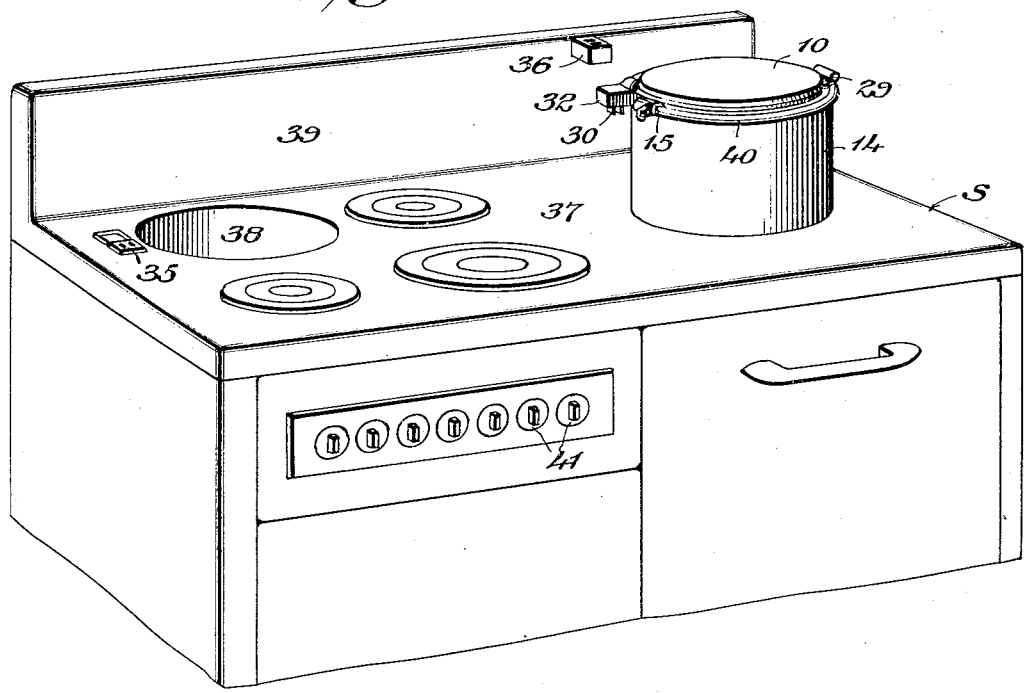
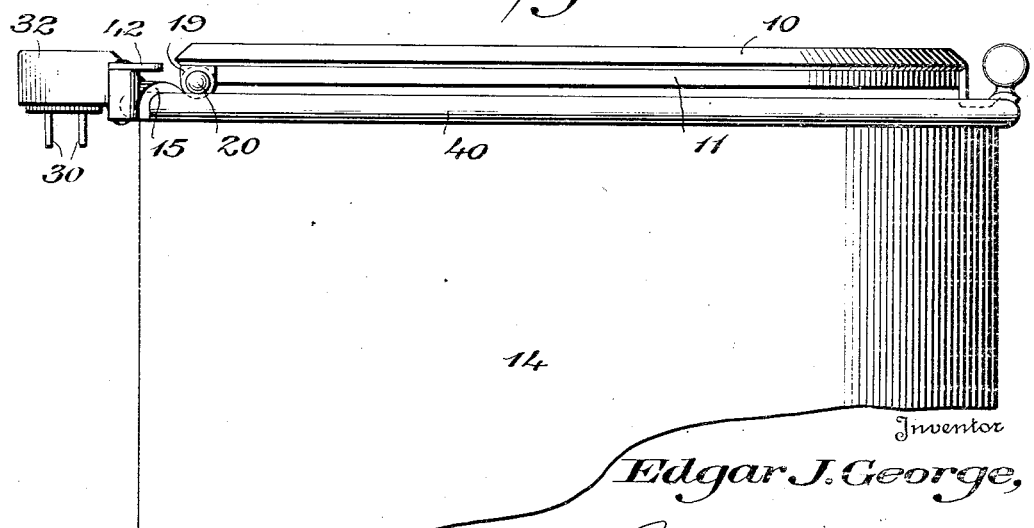
Inventor
Edgar J. George,
By Carroll Bailey,
Attorney Aug. 31, 1948.  E. J. GEORGE  2,448,215
ELECTRICAL COOKING DEVICE
Filed March 13, 1945  3 Sheets-Sheet 2

Inventor
Edgar J. George,
By Carroll Bailey
Attorney

Aug. 31, 1948.  E. J. GEORGE  2,448,215
ELECTRICAL COOKING DEVICE
Filed March 13, 1945  3 Sheets-Sheet 3
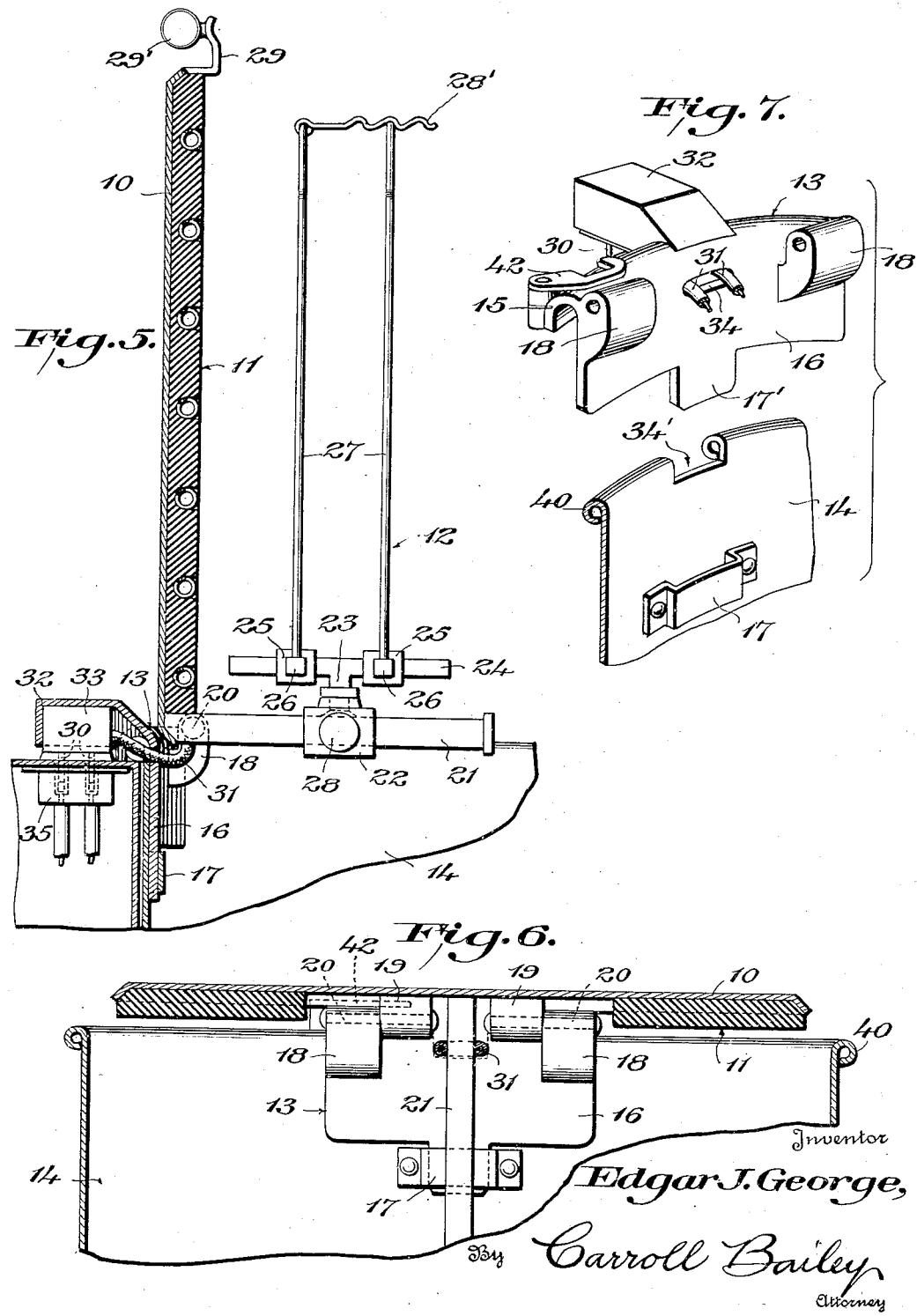
Inventor
Edgar J. George,
By Carroll Bailey
Attorney Patented Aug. 31, 1948

2,448,215

UNITED STATES PATENT OFFICE 2,448,215

ELECTRICAL COOKING DEVICE

Edgar J. George, Jacksonville, Fla.

Application March 13, 1945, Serial No. 582,437

3 Claims. (Cl. 99—339)

This invention relates to an electrical cooking device, and has for its general object to provide a simple, practical electrical cooking device which includes both a so-called "hot plate" and a grill, whereby it may be used for frying and analogous purposes as well as a heater for containers and the like, and also for broiling, toasting and similar purposes.

According to the invention, the so-called "hot plate" and the grill are mounted at opposite sides of an electrical heating element for either simultaneous or selective use, and the unit comprised by said hot plate, said heating element and said grill is pivotally mounted upon a bracket for swinging movements between horizontal and vertical positions, especially to facilitate use of the device for broiling or toasting purposes. In this connection, a special object of the invention is to provide a bracket which may readily be engaged with the side wall of a pan to mount the device upon the pan in overlying relationship thereto, thus to utilize the pan not only as a support for the device, but also as a collection receptacle for grease, juices and the like which may drip from either the hot plate or the grill.

Another special object of the invention is to provide a grill and supporting means therefor embodying a construction whereby the grill may readily be adjusted toward and away from the electrical heating element for fast or slow broiling or toasting of an article of food carried by the same, and whereby the grill also may readily be rotated to expose either side of an article carried by the same to the heat of the electrical heating element.

The device may readily be removed from a pan upon which it is mounted to facilitate cleaning of both the device and the pan and to permit the pan to be used separately from the device. Moreover, the device includes electrical connecting means whereby it may readily be connected by an ordinary electrical extension cord to any ordinary electrical outlet, thus rendering the device portable for use at any desired location. At the same time, the said electrical connecting means preferably is in the form of blades carried by the bracket whereby the device may be connected directly with an outlet socket, and in this connection another special object of the invention is to provide an electric cooking stove with a pair of electrical outlet sockets, one located adjacent to the usual cooking well therein to be directly engaged by said blades when the device is operatively associated with said well, and the other being mounted upon the usual rear panel of the stove at a proper elevation above the stove top to be directly engaged by said blades when the device is supported upon the stove top, whereby, in either instance, there may be afforded, in effect, an extra heating element, or burner for the stove to be used, as aforesaid, for either frying or general heating purposes or for broiling, toasting or similar purposes.

With the foregoing and other objects in view, which will become more fully apparent as the nature of the invention is better understood, the same consists in an electrical cooking device embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 1 is a perspective view of the top portion of an electric cooking stove having electrical outlet sockets located to be engaged by the electrical connecting blades of a device constructed in accordance with the invention, and showing a device constructed in accordance with the invention supported upon the stove top.

Figure 2 is a side elevation on an enlarged scale of a device constructed in accordance with the invention.

Figure 5 is a view similar to Fig. 4 showing the heating element, hot plate and grill disposed vertically.

Figure 6 is a fragmentary transverse section through the device; and

Figure 7 is a perspective view of the bracket constituting part of the device and of a portion of the side wall of a container with which said bracket is removably engageable.

Figure 3:
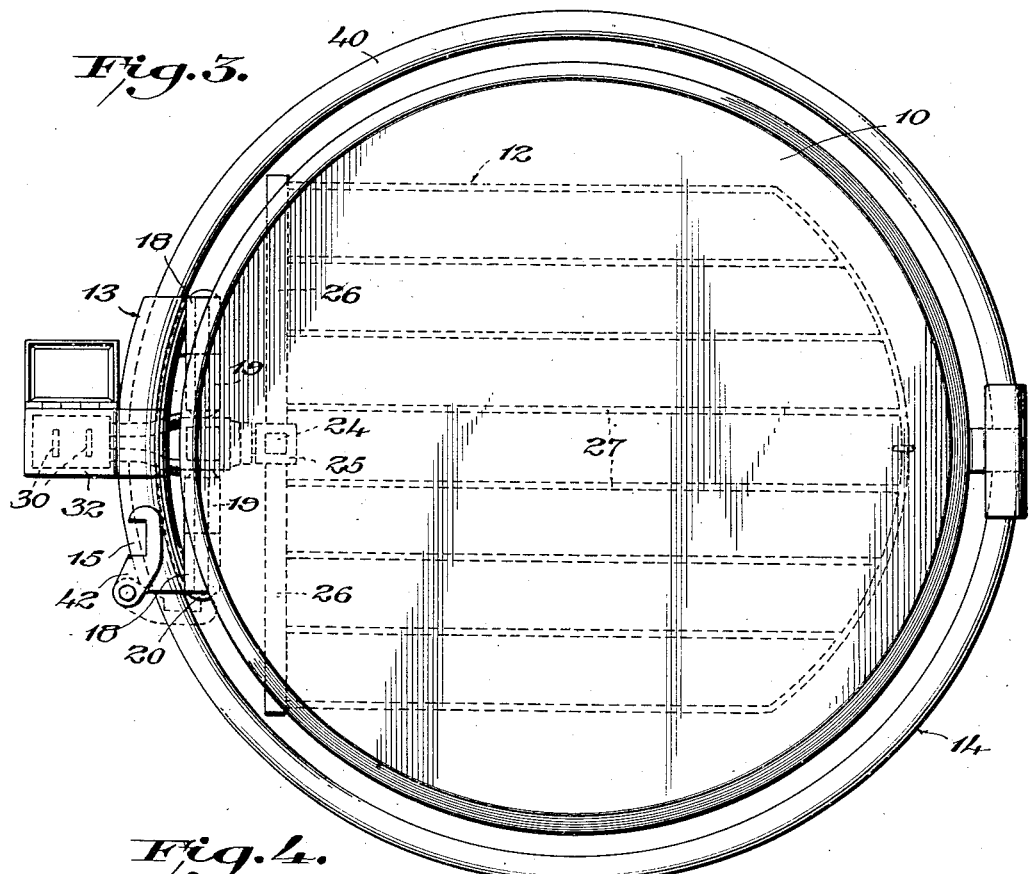
Figure 3 is a top plan view of the device.

Referring to the drawings in detail, it will be observed that the present device comprises a so-called "hot plate," designated as 10; an electrical heating element, designated as 11, mounted at the under side of said hot plate 10, and a grill, designated generally as 12, disposed at the under side of said heating element. It will further be observed that the hot plate 10, the electrical heating element 11 and the grill 12 are connected together in the form of a single unit, and that this unit is pivotally mounted upon a bracket 13 for swinging movements with respect thereto.

The bracket 13 may be of any suitable construction to be removably mounted upon any suitable support for the purpose of removably mounting the entire device thereon. Preferably, however, a suitable pan 14 is employed as a support for the device and preferably the bracket 13 is formed for ready engagement with the side wall of said pan to mount the device thereon. Thus, as best shown in Fig. 7 of the drawings, the bracket 13 may include a downwardly opening channel portion 15 at the top thereof to fit over the rim of the pan 14, and a plate portion 16 extending downwardly from the inner side of said channel portion 15 to rest against the inner face of the said side wall of said pan. Accordingly, the entire device may readily be operatively engaged with and removed from the pan 14 simply by vertical movements of the device relative to the pan. In this connection, if desired but not necessarily, the pan 14 may be provided at the inner side of its side wall with a strap 17 affording a socket to accommodate the lower end of the bracket plate portion 16, or to accommodate a tongue 17' projecting downwardly from said plate portion, thus to insure against any undesirable rocking or tilting movement of the bracket 13 relative to the pan 14 when said bracket is operatively applied to said pan.

The unit comprising the hot plate 10, the electrical heating element 11 and the grill 12 may be pivotally mounted upon the bracket 13 in any suitable manner. For example, the bracket 13 may have rigid therewith at the upper, inner side thereof, a pair of lugs 18, and the hot plate 10 may have rigid therewith at the under side and near the edge thereof a pair of lugs 19 connected to the lugs 18 by hinge or pivot pins 20. In any event, the pivotal or hinge connection between said unit and said bracket is such that said unit may be swung between horizontal and substantially vertical positions relative to said bracket and, of course, relative to the pan 14 when the device is operatively applied to said pan.

The hot plate 10 may be of any desired shape as viewed in plan, and the pan 14 preferably is of the same shape, as viewed in plan, as said hot plate, both being illustrated in the drawings as being circular in shape, which is preferred. In any event, when the hot plate is swung to its horizontal position it overlies the pan 14, and in this connection said hot plate is of somewhat smaller size than said pan so that when said hot plate is disposed horizontally there is afforded, between its periphery and the rim of said pan, a narrow space through which grease, and the like may drip from said plate into said pan.

The electrical heating element 11 may be of any suitable form and may be fastened to the hot plate 10 in any suitable manner. Likewise, the grill 12 may be of any suitable form and may be mounted in any suitable manner beneath said electrical heating element. In this connection and as illustrated in the present instance, the grill 12 includes a supporting bar 21 which is suitably attached at one end, as by welding, to the hot plate 10 near the edge thereof, preferably adjacent to the pivotal connection of said plate with the bracket 13, and which extends downwardly or rearwardly from said plate at right angles thereto. Mounted on this bar for non-rotative movement with respect thereto, but for sliding movement therealong, is a sleeve 22, and extending at right angles to said sleeve from the side thereof nearer the heating element 10, is a short pivot bar 23 which is suitably swiveled to said sleeve for axial rotation with respect thereto. The pivot bar 23 is provided with a T-head bar 24, and upon said T-head bar are mounted for non-rotative movements with respect thereto, but for sliding adjustments therealong, two sleeves 25, 25, from opposite sides of each of which extend other bars 26, 26 which are rigid with said sleeves and which are disposed at right angles to the T-head bar 24 as well as at right angles to the axis of the short pivot bar 23. Each pair of the bars 26, 26 carries a series of small grill rods or wires 27 which extend from said bars 26 beneath or behind the electrical heating element 11. It will be apparent, therefore, that, by adjustment of the sleeves 25, 25 along the T-head bar 24, the two series of grill rods or wires are adjustable toward and away from each other to accommodate therebetween articles of food such as steaks, bread, or the like of different thicknesses to be broiled or toasted; that by adjustment of the sleeve 22 along the supporting bar 21 an article of food disposed between the two sets of grill rods or wires may be moved toward and away from the heating element 11 to obtain fast or slow broiling or toasting of the said article of food; and that by rotating the pivot bar 23 relative to the sleeve 22, the T-head bar 24 and the grill rods or wires may be rotated to dispose either side of the article of food toward the heating element 11.

If considered necessary or desirable, any suitable means may be provided to secure the sleeve 22 in any desired position of adjustment along the supporting bar 21. For example, the sleeve 22 may be provided with a set screw 28 engageable with the supporting bar 21 for this purpose. Similar means may be provided for securing the sleeves 25, 25 in desired positions of adjustment along the T-head bar 24 or, alternatively, one of the grill rod or wire elements may be provided with a latch element as indicated at 28' for engagement with the other of said elements for holding them in embracing relationship to an article of food disposed therebetween.

Figure 4:
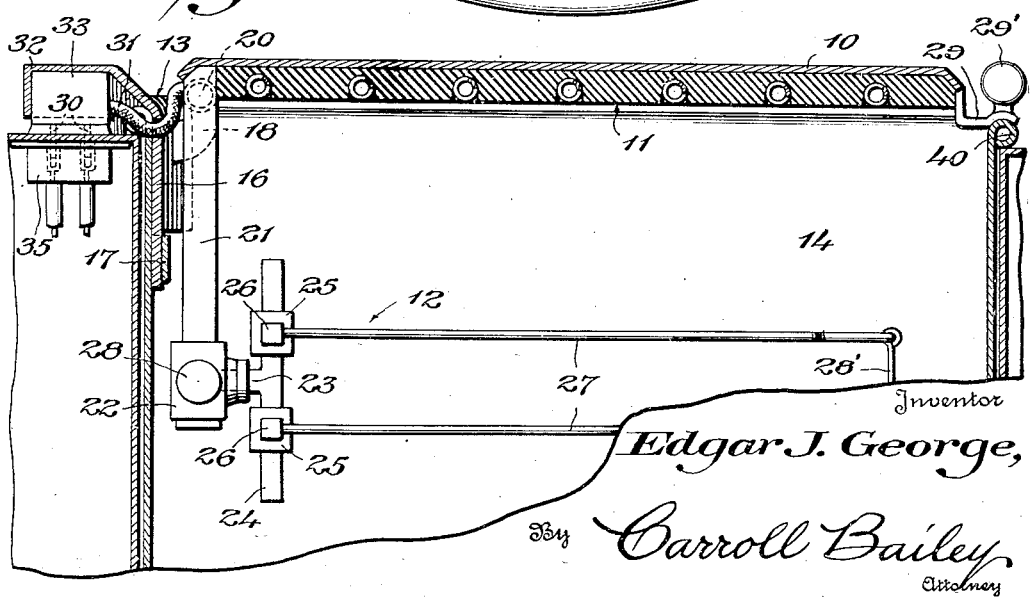
Figure 4 is a central, vertical section through the device showing the heating element thereof and its associated hot plate and grill disposed horizontally.

Obviously, the grill 12 may be used when the device 10 is in either its horizontal position as shown in Fig. 4 or in its vertical position as shown in Fig. 5. In any event, because of the pivotal connection of the hot plate 10 with the bracket 13, the unit comprising said hot plate, the heating element 11 and the grill 12, is readily swingable between horizontal and vertical positions to facilitate use of the device especially for broiling or toasting purposes. In this connection, any suitable means may be provided to hold the said unit in upright position. For example, the bracket 13 may have pivoted thereto a latch 42 to be swung into engagement with said unit for this purpose. Moreover, the hot plate 10 may be provided at a point remote from its pivotal connection with the bracket 13 with a tongue 29 for engagement with the rim of the pan 14 to assist in supporting said unit in its horizontal position, and said tongue may carry a suitable handle 29' for use in raising and lowering the unit comprising said hot plate 10, the heating element 11 and the grill 12.

Obviously, any suitable provision may be made for supplying electric current to the electric heating element 11. Preferably, however, the bracket 13 is provided with suitable terminals 30 which are connected by wires 31 to the heating element 11 and which are of a form to have detachably connected therewith one end of an ordinary electrical extension cord (not shown), the other end of which may be connected with any ordinary electrical outlet fixture, whereby the device may be used at various different locations. In this connection, to the end of providing a neat, compact structure, the bracket 13 may carry, rigid therewith and projecting outwardly therefrom, a housing 32 in which may be suitably mounted a terminal block 33 carrying the terminals 30 from which the wires 31 may extend inwardly to the heating element 11 through a suitable opening 34 in the plate 16, the rim of the pan 14 being notched as indicated at 34' if necessary to accommodate said wires.

The terminals 30 may be in the form of two or more blades for insertion into the usual slots of an ordinary electrical outlet fixture, and they preferably extend downwardly from the block 33 for insertion into an outlet fixture the slots of which open through the top thereof. In this connection, the invention contemplates providing an electric cooking stove S with a pair of ordinary electric outlet fixtures 35 and 36, one mounted in the stove top 37 adjacent to the usual cooking well 38 of the stove and the other mounted on the usual rear panel 39 of the stove and both having their slots opening upwardly to receive the blades 30. The pan 14 is of a size to be freely lowered into the well 38 and the outlet 35 is located in such proximity to said well as to adapt its slots directly to receive the blades 30 when said pan 14, with the bracket 13 operatively applied thereto, is lowered into said well. At the rim of the pan is a bead 40 to engage the stove top and thus support the pan in the well 38, and the arrangement in this respect is such that by first aligning the blades 30 with the slots in the outlet fixture 35 and by then lowering the pan 14 until its bead 40 comes to rest upon the stove top, the said blades 30 become operatively engaged in the slots of said outlet fixture 35 and thereby connect the heating element 11 with the source of current of the stove. The other outlet fixture 36 is located to have its slots engaged by the blades 30 when the pan 14 is resting upon the stove top. Thus, the present device may be used either in the well 38 or in a definite position upon the stove top without an extension cord to supply current to the same, and in either case it advantageously affords, in effect, an extra burner for the stove as well as a broiler or toaster. Of course, by the use of an extension cord, it may be used in other positions upon the stove top or elsewhere.

If a stove is equipped with outlets such as the outlets 35, 36, it preferably is equipped also with related switches 41 for controlling flow of current through said outlet.

The pan 14 may be of any suitable depth, but preferably it is of a depth to extend approximately to the bottom of the well 38 so that it may be used as a cooking vessel to be heated by the usual electrical heating means at the bottom of said well, during the same time, if desired, that the unit mounted upon the top thereof is used for some other cooking or heating purpose.

From the foregoing description considered in connection with the accompanying drawings it is believed that the construction and operation of the present device will be clearly understood and its advantages appreciated. It is desired to point out, however, that while only a single, specific construction has been illustrated and described, the invention is readily capable of embodiment in various specifically different constructions within its spirit and scope as defined in the appended claims.

I claim:

1. An electrical cooking device comprising an electrical heating element, and a grill mounted at one side thereof, said grill comprising a supporting bar mounted fixedly with respect to said heating element and extending at right angles thereto, a sleeve mounted non-rotatably on said bar for sliding movement therealong, a pivot bar extending at right angles to said sleeve and pivoted thereto for axial rotation, a T-head bar carried by said pivot bar, a pair of sleeves mounted non-rotatably on said T-head bar for sliding adjustments therealong toward and away from one another, bars carried by said pair of said sleeves and extending at right angles to said T-head bar and to the pivotal axis of said pivot bar, and food clamping grill elements carried by said last mentioned bars.

2. An electrical cooking device comprising a unit including an electrical heating element, a hot plate mounted fixedly with respect to said heating element at one side thereof, and food clamping means comprising a pair of grill elements mounted at the other side of said heating element for collective adjustments toward and away from said heating element and also for adjustments toward and away from each other and for collective rotation to dispose either grill element nearer said heating element, and a bracket to be secured to a support and upon which said unit is mounted for swinging movements between a horizontal position with the hot plate disposed uppermost and a substantially vertical position in which the food clamping means is readily accessible.

3. An electrical cooking device comprising an electrical heating element, a supporting bar fixed with respect to said heating element and extending at right angles thereto beyond one side thereof, a sleeve on said supporting bar slidably adjustable therealong, a T-bar including a leg disposed at right angles to said sleeve and rotatably connected thereto, said T-bar further including a pair of arms extending in opposite directions from and at right angles to said leg, and a pair of food clamping grill elements mounted on said arms for adjustments therealong toward and away from each other, said grill elements being collectively adjustable with said T-bar and said sleeve along said supporting bar toward and away from said heating element and being collectively rotatable with said T-bar relative to said sleeve to dispose either grill element nearer said heating element.

EDGAR J. GEORGE.

REFERENCES CITED

The following references are of record in the file of this patent:

UNITED STATES PATENTS

| Number | Name | Date |
|---|---|---|
| 224,740 | Stafford | Feb. 17, 1880 |
| 505,433 | Boggs | Sept. 26, 1893 |
| 949,764 | Hammerstein | Feb. 22, 1910 |
| 1,117,277 | Supplee | Nov. 17, 1914 |
| 1,149,590 | Moe | Aug. 10, 1915 |
| 1,222,669 | Purnell | Apr. 17, 1917 |
| 1,263,359 | Armstrong | Apr. 23, 1918 |
| 1,832,831 | Ginder | Nov. 17, 1931 |
| 1,952,763 | Lux | Mar. 27, 1934 |
| 2,234,596 | Heilman | Mar. 11, 1941 |
| 2,266,099 | Uhlrig et al. | Dec. 16, 1941 |
| 2,313,968 | Reich | Mar. 16, 1943 |
| 2,371,975 | Parsons | Mar. 20, 1945 |
| 2,379,239 | Krebs | June 26, 1945 |

FOREIGN PATENTS

| Number | Country | Date |
|---|---|---|
| 10,735 | Great Britain | 1908 |